Feb. 5, 1957 W. K. B. KIEL ET AL 2,780,411
CALCULATING MACHINE
Filed Nov. 6, 1952 5 Sheets-Sheet 1

Inventors:
Wilhelm K. B. Kiel
Ulrich F. R. Liesenberg

United States Patent Office 2,780,411
Patented Feb. 5, 1957

2,780,411

CALCULATING MACHINE

Wilhelm K. B. Kiel, Nurnberg, and Ulrich J. R. Eichler, Nurnberg-Ebensee, Germany; said Kiel assignor to Metall-Guss- und Presswerk Heinrich Diehl G. m. b. H., Nurnberg, Germany Application November 6, 1952, Serial No. 319,158

Claims priority, application Germany November 15, 1951

16 Claims. (Cl. 235—63)

The present invention relates to calculating machines and, more particularly to calculating machines which include a carriage carrying accumulator and counter mechanisms and which also comprise motor means for adjusting said carriage relative to a setting mechanism.

With calculating machines of this type, it has repeatedly been attempted to simplify the frequently occurring operations of clearing the accumulator and counter mechanisms and returning the carriage to its normal or basic position. To this end, calculating machines have been designed the stationary part of which is provided with a function control key operable to cause the carriage to return to its basic position while at the end of the said return movement of the carriage the accumulator and counter mechanisms or registers may be cleared. The arrangement is such that by turning manually operable means provided on the carriage, the clearing of the registers may be effected selectively. An important disadvantage of this known arrangement consists in that the motor clearing of the register can be effected only at the end of the return movement of the carriage and that the clearing of the registers in other positions of the carriage must be effected by manually operable means on the carriage. This combined manual and motor clearing causes confusion of the operation of the calculating machine.

Furthermore, calculating machines have been known in which the registers in the carriage can be cleared in any position of the carriage. These known machines, however, have no separate return key. Also the operation of such calculating machines is cumbersome, particularly when simultaneously with the clearing of the registers, the command "carriage return" is to be entered into the machine.

It may also be mentioned that calculating machines have been designed in which the registers provided in the carriage can likewise be cleared in any position of the carriage and in which there is also provided a separate return of the carriage. In these devices, however, the return of the carriage can be effected selectively only by means of a special manually operable means in connection with one of the two clearing operations. Also this design does not present a satisfactory solution of the problem involved inasmuch as the making effective and ineffective of the return of the carriage by special manually operable means not only is cumbersome but can also be easily overlooked so that faulty operations will result.

It is, therefore, an object of this invention to provide a calculating machine which will overcome the above mentioned drawbacks.

It is another object of this invention to provide a calculating machine having a carriage with a plurality of calculating mechanisms or registers, in which said calculating mechanisms or registers may in any position of the carriage, be cleared by actuation of a function control key arranged in the stationary part of the machine while the carriage may be caused by actuation of a function control key automatically to return to its normal or basic position.

It is a further object of this invention to provide a calculating machine of the type set forth in the preceding paragraph, in which the function control keys for clearing the accumulator and counter mechanisms and the function control key for returning the carriage may be actuated independently of each other as to time.

It is also an object of this invention to provide a calculating machine having a carriage with an accumulator and counter mechanism, and a return key operable to bring about an automatic return of the carriage to its basic position, in which, when actuating the return key simultaneously with or in quick succession to the clearing keys for clearing said accumulator and counter mechanisms, the return movement is automatically stored until and carried out after the clearing operation has been completed.

A still further object of this invention consists in the provision of a calculating machine of the type referred to above, in which the accumulator as well as the counter mechanism may be cleared individually and independently of each other.

These and other objects and advantages of the invention will appear more clearly from the following specification in connection with the accompanying drawings, in which.

GENERAL ARRANGEMENT

Figure 1:
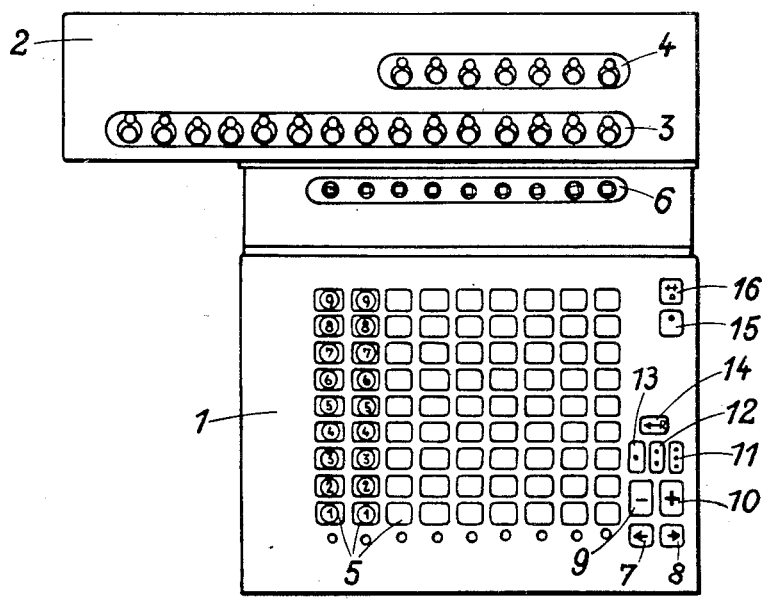
Fig. 1 represents a top view of the entire calculating machine.

According to the present invention, there is provided a calculating machine which comprises a power adjustable carriage adapted to be moved relative to the setting mechanism and provided with registers, especially with a revolutions counter and one or more accumulators. The said calculating machine is furthermore provided with a device by means of which the registers in the carriage may be cleared in any position of the carriage by actuation of function control keys mounted in the stationary machine frame. The calculating machine according to the invention is, additionally provided with a separate return key operable to cause the carriage automatically to return to its basic position. A particularly effective and easily operable calculating machine is obtained when, according to the invention, the return key and the clearing keys for the registers in the carriage and, if desired, also the clearing keys for the setting mechanisms are arranged adjacent to each other and, while being combined to an operative group, are mounted on the stationary machine part.

Inasmuch as frequently the return key has to be actuated together with only one or two of the available clearing keys, the return key is, according to the invention, given an oblong shape and is arranged parallel to the clearing keys which are arranged in a row.

According to a preferred embodiment of the invention, the calculating machine is so designed that the registers in the carriage are provided with clearing gears adapted to be cleared in each of the indexing positions which may be occupied by the carriage.

The clearing operation must, of course, be blocked in the various positions located between the said individual positions. However, this would necessitate that the clearing of the registers and the carriage return cannot be carried out independently of each other as to time. This necessity has been obviated by the present invention. According to an embodiment of this invention, the device may be so arranged that, when actuating one or both clearing keys for the registers in the carriage, during or after actuation of the return key, the return movement of the carriage is interrupted, and the clearing operation is carried out, while, subsequently thereto, the return operation is automatically completed by the machine.

The interruption of the return movement of the carriage may, for instance, be effected in such a manner that the operation of the control trains for the clearing operation and return movement is carried out by power actuated members, the movement of which is initiated or released by means of command members associated with said control members. A particularly simple construction is obtained when the power actuated control members consist of spring actuated control levers which, with each motor turn, are returned to their starting position by means of a resetting mechanism.

According to a particularly simple structural arrangement of the invention, the clearing of the registers in the carriage, particularly of accumulator and revolutions counter, is respectively effected by a clearing lever adapted to be tilted by the motor turn. Such clearing lever may, for instance, be arranged on a square shaft in such a manner that by means of a corresponding clearing train it can be brought into and moved out of range of a clearing bar co-operating with the respective clearing lever.

According to the present invention, the clearing movement is taken off from the drive shaft for the left and rightward carriage shift, while each clearing bar has associated therewith a separate clearing train.

In order further to simplify the arrangement, there may, according to the present invention, be provided a common power control member for the clearing of the accumulator and counter mechanisms. In order to be able to clear said last mentioned mechanisms selectively individually or collectively, it is merely necessary that each clearing key has associated therewith a coupling lever. The arrangement is such that prior to the release of the common power control member by the respective command lever, each coupling lever establishes coupling connection between the power control member and the respective train or the respective clearing member. In order to avoid a blocking of the machine when simultaneously actuating the clearing keys and other keys, for instance for calculating or carriage shifting, the machine must be provided with corresponding blocking means. Such blocking means or locks may be reduced to a minimum, and the design may be further simplified, when no separate power control member is used for the actuation of the clearing trains but if instead use is made of a power control member which is already available for other functions. Thus, in a particularly simple manner, the power control mechanism used for bringing about the carriage shift movement, especially the leftward shift, is employed in part also for conveying one or two, especially two clearing commands. To this end, the coupling members which may, for instance, consist of two arm levers and are provided for coupling the clearing trains or clearing levers to the power control member, are tiltably mounted in one part of the power control train so that the said coupling members may be switched from one position to another position and vice-versa. In this way, by actuation of the clearing key, the switch over can first be effected, and subsequently the command member can be released.

In order to be able to actuate the various control trains, namely the left carriage shift and the two clearing trains, selectively individually and in order also to be able selectively to actuate the two clearing trains collectively, the arrangement may be such that, when actuating one of the two clearing keys, the coupling member associated with the last mentioned clearing key is moved from its position in which it is coupled to the carriage shift control train to a position in which it is coupled to the respective clearing control train, whereas when actuating the other clearing key, it is moved into an intermediate position in which it is coupled neither to the control train for the carriage shift nor to the control train for clearing. In this position, the second coupling member must be coupled to the second clearing control train so that at any rate also the second clearing movement can be carried out independently of another movement.

The arrangement may also be such that the return key likewise engages the same command member which brings about operation of the power controlled train carrying out the clearing operation and the left carriage shift. The return key may in its depressed condition be locked by a locking pawl adapted in the end position of the carriage to be released in a manner known per se and thus to stop the return movement.

STRUCTURAL ARRANGEMENT

While the invention is not limited to, it will be described in connection with a calculating machine of the Thomas type provided with stepped drums and with full key board. It is also to be noted that the selected embodiment for describing the invention concerns a calculating machine in which the operation of the trains adapted to make effective the leftward and rightward carriage shift, and also the actuation of the trains for bringing about plus and minus calculation, is effected by power operated control members adapted to be released by command members associated therewith either by operation of function control keys or automatically by the machine, said power actuated control members being combined in the manner of a magazine to a so-called control center.

Structure of the calculating mechanism

Referring now to Fig. 1, the calculating machine shown therein comprises a stationary machine part 1 in which the carriage 2 is adjustable by decades. The carriage 2 comprises an accumulator 3 of which Fig. 1 shows the peepholes only for the number discs and the handles for manually adjusting the number discs. The reference number 4 designates a so-called revolutions counter or register. The keys of a setting mechanism protrude beyond the upper side of the stationary machine part 1. The said keys are combined to key banks 5 each of which comprises the numerals 1—9. The arrangement, furthermore, comprises a control mechanism 6 to indicate the number values entered into the respective key banks.

The right hand side of the stationary part 1 is occupied by the function control keys of which the key 7 is adapted to bring about the carriage shift toward the left. The key 8 is intended to release the carriage shift toward the right, while the key 9 is intended to bring about minus calculation. The key 10 is adapted to bring about plus calculation, and key 11 is intended for clearing the setting mechanism. The key 12 serves for clearing the revolutions counter and the key 13 serves for clearing the accumulator. When actuating the function control key 14, the carriage 2 returns to its basic or normal position shown in Fig. 1. The key 15 together with the key 16 forms the actuating means for bringing about an automatic division.

Figure 2:
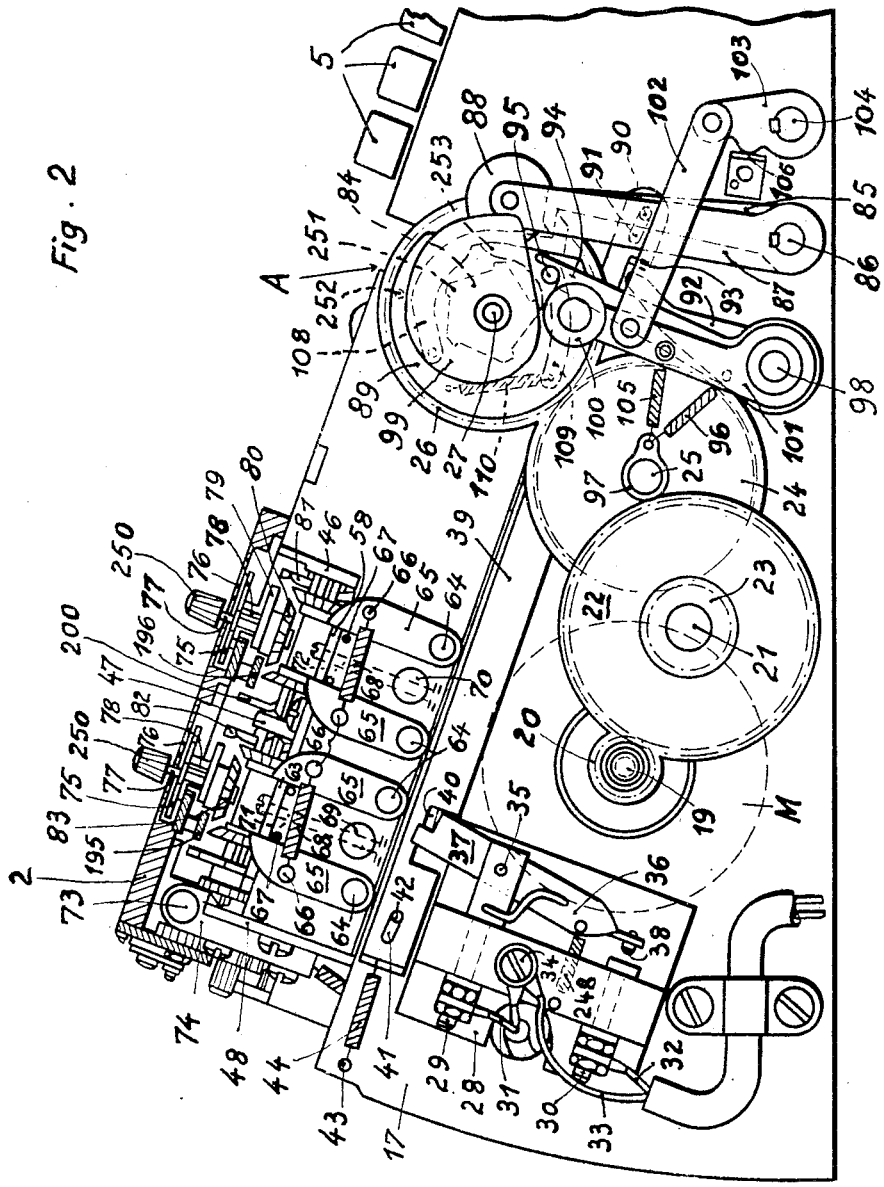
Fig. 2 is a view of the machine when looking upon the left frame wall thereof, while the carriage is shown in section and the machine covering has been omitted.
Figure 3:
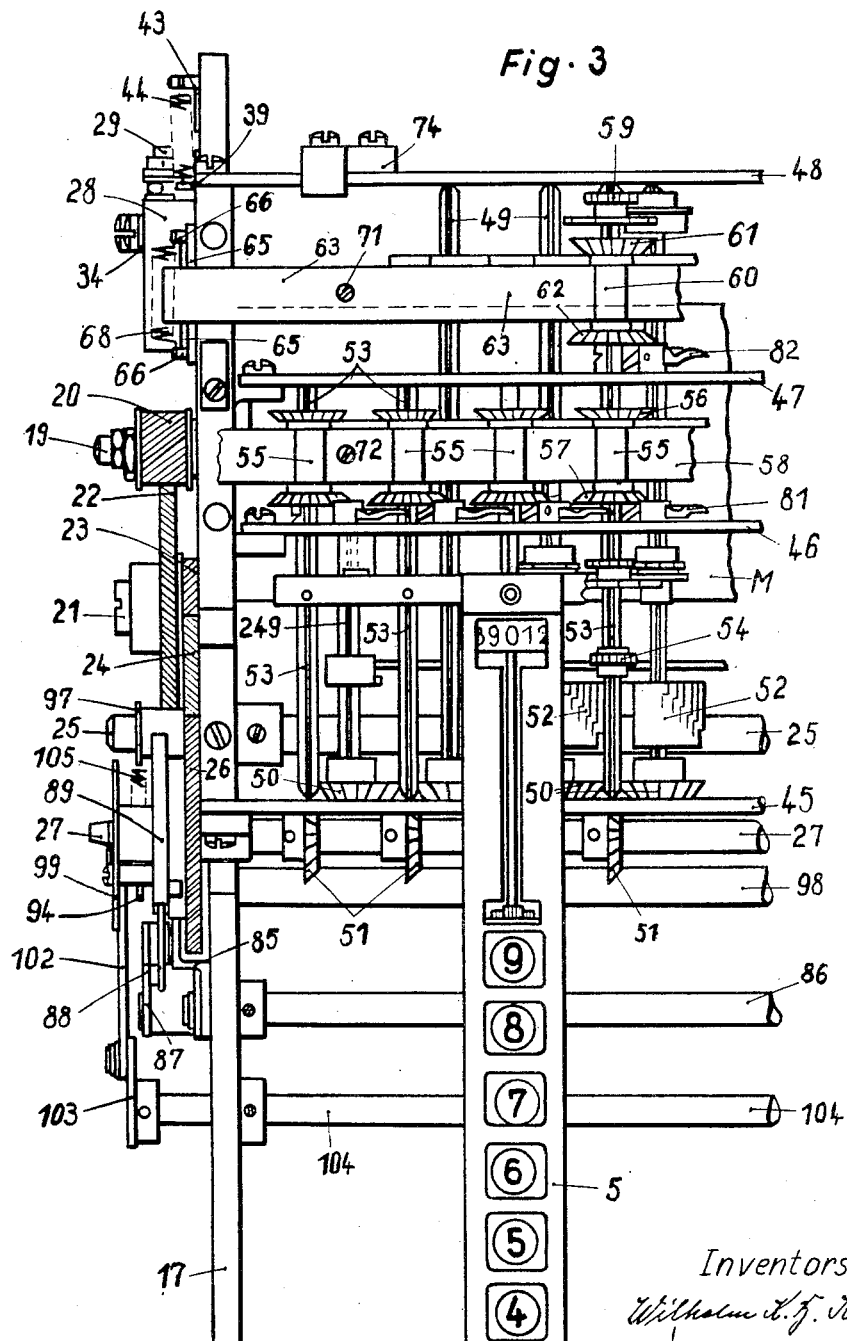
Fig. 3 illustrates a view of the machine when looking upon the left side of the machine with regard to Fig. 1, while the carriage and covering of the machine has been omitted and one key only bank is shown.

Figs. 2 and 3 illustrate the drive for the calculating machine and a part of the control mechanism and also show the arrangement and design of the calculating mechanism and of the carriage carrying the accumulator and counter mechanisms. Mounted on the inner side of the left frame wall 17 is an electric motor M the drive shaft 19 of which extends through the frame wall 17 and on the outside of the latter is provided with a gear 20. Freely rotatably mounted on the shaft 21 is an intermediate gear system comprising the gear 22 and the pinion 23. The gear 22 meshes with the pinion 20, while the pinion 23 meshes with the gear 24. The gear 24 is rigidly connected to the shaft 25 which latter serves as driving shaft for the carriage shift and for the clearing mechanism. A gear 26 having the same diameter as the gear 24 meshes with the latter and is freely rotatably mounted on the shaft 27. The gear 26 is adapted to be coupled with the shaft 27 by means of a coupling device which will be explained later. The shaft 27 represents the main driving shaft for the calculating machine.

The outside of the frame wall 17 is furthermore provided with contacts for switching on the motor. Connected to the insulated base 28 are two contact pins 29 and 30 having respectively connected thereto the conductor 31 and the conductor 32 for conveying current to the motor. The second current conveying conductor 33 leads through a contact screw 34 likewise to the motor M. The contact pin 29 has connected thereto a two arm contact lever 36, 37 tiltable about the pivot 35. The lower lever arm 36 of the contact lever is provided with a contact 38 adapted in cooperation with the fixed contact pin 30 to close the circuit. As shown in Fig. 2, the contact lever 36, 37 is normally held in its ineffective position by means of an abutment 40 on the bar 39, which abutment engages the upper arm 37 of the contact lever. When the bar 39 is moved toward the right with regard to Fig. 2, the contact lever 36, 37 is tilted in clockwise direction by the spring 248 so that the motor circuit is closed. The bar 39 is provided with an oblong hole or slot 41 through which extends a pin 42 which supports the bar 39 so that it is slidable along the machine frame. The bar 39 is held in its basic position shown in Fig. 2 by means of a spring 44 which has one end connected to the bar 39 while its other end is connected to a pin 43 on the frame wall. Mounted in the rear portion of the calculating machine between the left frame wall 17 and the right frame wall (not shown) there is a calculating mechanism which comprises a transfer mechanism working with stepped drums known per se. The calculating mechanism is provided with bearing bars 45, 46, 47 and 48 (Fig. 3) arranged between the frame walls. Mounted between said bearing bars is a number of square shafts. Between the outermost bearing bars 45 and 48 there is provided a first group of shafts 49 of square cross section. The square shaft 249 intended for the highest decade extends between the bearing bars 45 and 46 only. The front end of all square shafts 49 and also of the square shaft 249 is provided with bevel gears 50 each of which meshes with a bevel gear 51. The bevel gears 51 are rigidly connected to the main drive shaft 27. The stepped drums 52 are mounted on the square shaft 49 between the bearing bars 45, 46. Mounted between the bearing bars 45 and 47 is a second group of square shafts 53 each of which, with the exception of the last two on the left side of the calculating machine, carries a setting wheel 54 which is movable along the stepped drums 52 in axial direction. Between the bearing bars 46 and 47, the square shafts 53 are provided with so-called change sleeves 55 the two ends of which carry bevel gears 56 and 57. The change sleeves 55 are adapted by means of adjusting bars 58 to be moved in axial direction on the square shafts 53 from a central position in either direction. The change sleeves 55 are intended to bring about a rotation of the counting discs of the accumulator in positive and negative direction. Furthermore, between the bearing bars 47 and 48 there are mounted square shafts 59 which carry change sleeves 60 the ends of which have mounted thereon bevel gears 61 and 62. The change sleeves 60 are likewise adapted to be moved axially and in both directions. The change sleeves 60, one of which only being shown in Fig. 3, serve for driving the counting discs for the revolutions counter in positive as well as negative direction.

The adjusting bars 58 and 63 for the two groups of change sleeves are held in their neutral or intermediate position by means of levers 65 which are pivotally mounted on bolts 64 arranged on the outside of the left frame wall (Fig. 2). The levers 65 are provided with pins 66. Furthermore, the frame wall has mounted thereon abutment pins 67 (Fig. 2) arranged below the adjusting bars 58 and 63. The adjusting bars 58 and 63, which somewhat protrude beyond the frame wall 17, are each straddled by the two levers 65, which levers by means of the bolts 66 and a preloaded spring 68 are held against the abutment pins 67. It will be seen, particularly from Fig. 2, that the springs 68 maintain the adjusting bars 58 and 63 in a neutral or intermediate position. Shafts 69 and 70 are provided for adjusting the adjusting bars 58 and 63. These shafts 69 and 70 which are mounted between the frame walls and below the adjusting bars 58 and 63 are connected with the adjusting bars 58 and 63 adjacent to two ends of the frame walls by means of the levers 71 and 72. In order to adjust the adjusting bars 58 and 63 toward the front and toward the rear, the two shafts 69 and 70 must be rotatable in both directions.

Further details of the drives for the revolutions counter and accumulator mechanisms, and details of the said mechanisms in the carriage will be obvious from Fig. 2. The carriage 2 is journalled in bearings 74 by means of a guiding rod 73. The bearings 74 are connected to the rear bearing bar 48 in the neighborhood of the two ends of the machine. The carriage is furthermore provided with a front and rear row of counting discs 75 which represent the indicating elements of the accumulator and revolutions counter. The counting discs 75 are arranged below the upper surface of carriage 2 in such a manner that only one number at a time will be visible through the peephole 76. The counting discs 75 are rigidly connected to shafts 77 which are journalled in the carriage. The shafts 77 which protrude beyond the upper side of the carriage are adapted selectively manually to be adjusted by actuation of the turning knobs 250. Each shaft for the counting discs, furthermore, carries a clearing pinion 78, a decade shifting finger 79, and a driving bevel gear 80 or 83. The bevel gears 80 are arranged within the range of the bevel gears 56 and 57 of the change sleeves 55 in such a manner that, when adjusting the change sleeves 55 towards the front or towards the rear, each of the bevel gears 56 or 57 will mesh with the drive gear of the counting discs. The fingers 79 are arranged within the range of decade shifting levers 81 and 82 on bearing bars 46 and 47 so that during a change of the counting discs 75 from nine to zero or from zero to nine, the decade shifting levers 81 and 82 tiltably mounted on the machine frame are adjusted so that during the calculating operation a decade transfer to the next higher decade may be effected. Details of this decade transfer are not shown in the drawing as they are not necessary for an understanding of the invention. The counting position of the revolutions counter are laid out analogous to those of the accumulator. Also here the corresponding bevel gears 83 are driven by corresponding change sleeves 60 or the bevel gears 61 and 62 thereof, while the square shafts 59 are driven likewise by the square shaft 49 through the intervention of decade shifting mechanisms. Details for this drive and decade shifting mechanisms appear to be superfluous inasmuch as they are not essential for an understanding of the invention.

As mentioned above, the calculating machine comprises a key board consisting of a plurality of key banks 5. Number values may be entered into the key board as a result of which a corresponding movement of the setting wheels 54 on the transfer shafts 53 is effected. Arrangements of this type are well known and, since a showing and description of the respective operations is not necessary for the understanding of the invention, a further discussion of this arrangement does not appear to be necessary. It is merely important to keep in mind that a single rotation of the main calculating shaft 27, depending on the position of the setting wheel 54 relative to the respective stepped drum 52, causes a number value corresponding to the keyed-in value to be transferred through the change sleeves to the counting discs and, more specifically, to the drive wheel of the number discs in positive or negative direction, depending on the position of the change sleeves.

Calculating drive

Figure 4:
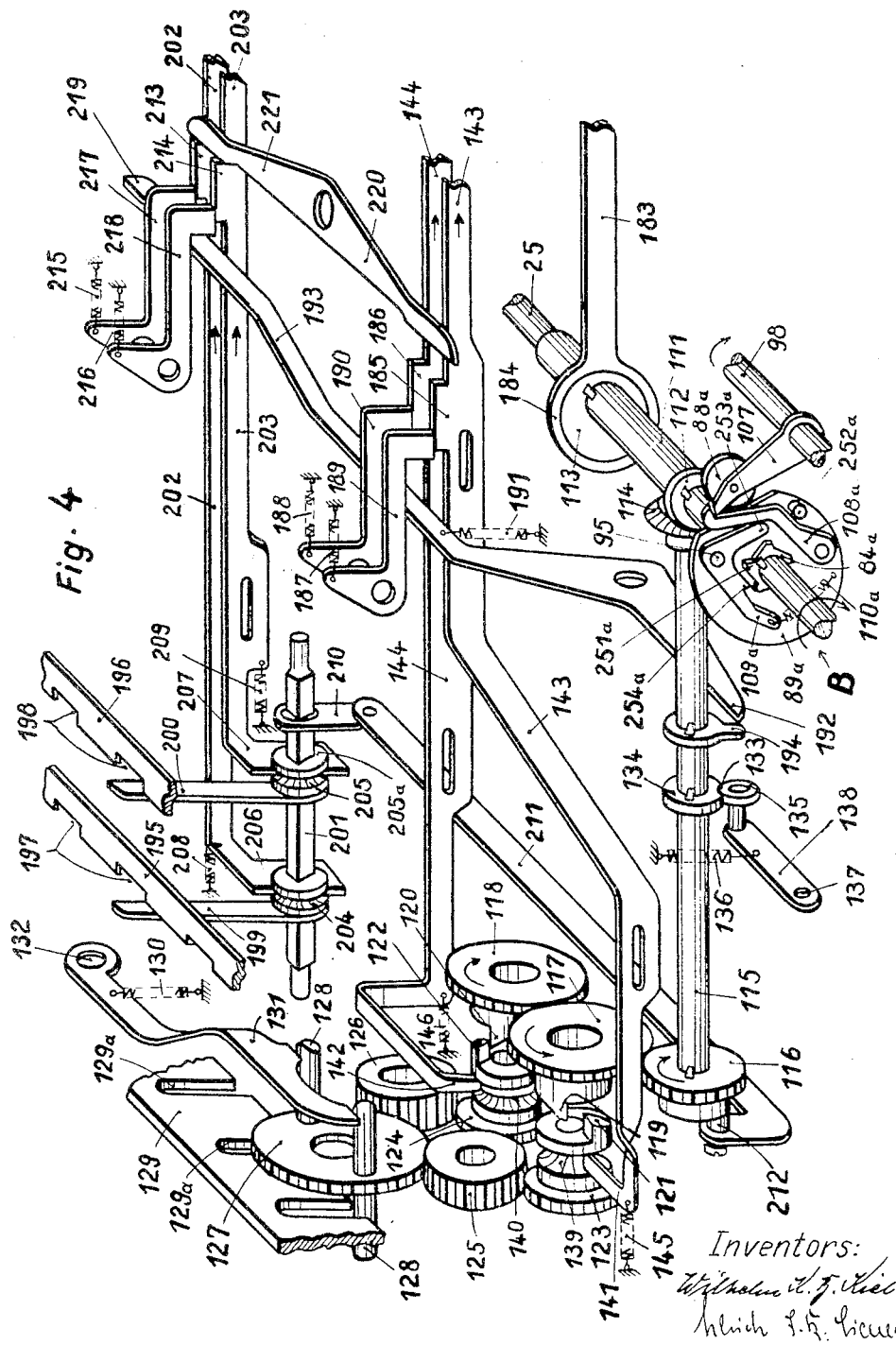
Fig. 4 is a perspective and diagrammatic view of the shift mechanism for the carriage and also shows the clearing mechanism for the registers in the carriage.

Reference will now be had to the control mechanism provided for making the calculating drive effective and ineffective. The gear 26 (Fig. 2) freely rotatable about the main calculating shaft 27 is provided with a ratchet 84 through which the gear 26 may be coupled to the main calculating shaft 27. This coupling or clutch is designated with the reference character A. Fig. 4 shows a similar coupling or clutch B which is intended for driving the carriage shift and clearing mechanism. The clutch A may be made effective by means of a pawl 85 which is rigidly connected to a control shaft 86 extending through the calculating machine from left to right. Also connected to the control shaft 86 is a lever arm 87 the end of which is provided with a roller 88. The main calculating shaft 27 has furthermore rigidly connected thereto a disc 89. Rigidly connected to the shifting lever 85 is a pin 90 which extends into a slot 91 provided in the control bar 39. As will be seen from Fig. 2, a lever 92 is rigidly connected to the end of control shaft 98 for the carriage shift. When the lever 92 is tilted in clockwise direction, it engages the abutment 93 on the control bar 39, so as to be able to take the latter along toward the right (with regard to Fig. 2). A lever 94 is rotatably mounted on that end of the shaft 98 which protrudes beyond the machine frame. This lever 94 is adapted after each complete revolution to engage the pivot 95 on the disc 89. The lever 94 has the purpose of maintaining the main calculating shaft 27 in the position shown in Fig. 2 after the clutch elements have disengaged each other, and to prevent a return movement of said shaft 27. The position of the lever 94 is controlled by a spring 96 having one end thereof connected to the lever 94 while the other end of said spring engages an ear of a ring 97 mounted on the shaft 25. It will be clear from Fig. 2 that, when the control shaft 86 is rotated in clockwise direction, the drive clutch A connects the main calculating shaft 27 with the motor M. Through the intervention of the pin 90, the bar 39 is simultaneously moved toward the right (with regard to Fig. 2) so that through the intervention of the spring 248 the circuit for the motor M is closed through the elements 30 and 38. During one revolution of the main calculating shaft 27, the roller 88 rolling on the disc 89 maintains the lever 87 in its open position as a result of which the motor M remains effective until one calculating revolution has been completed. It may be mentioned that the lever 92 connected to the control shaft 98 performs a similar function. The lever 92 by means of the abutment 93 maintains the bar 39 in its rightwardly adjusted position when the drive clutch B for the carriage shift is made effective, so that the motor contact likewise remains closed. The main calculating shaft 27 has furthermore rigidly connected thereto a cam disc 99 which is arranged within the range of the roller 100, said roller being rotatably mounted on the lever 101. The lever 101 is likewise rotatably mounted on the protruding portion of shaft 98 and is connected by means of a link 102 with the end of lever 103 which lever is rigidly connected to a shaft 104 extending through the calculating machine from left to right. A spring 105 having one end thereof connected to the lever 101 and having its other end suspended in the ring 97 maintains the two levers 101 and 103 in such a position that lever 103 is in engagement with the abutment 106. The shaft 104 represents the resetting shaft for calculating which, however, has no bearing on the present invention. The shaft 104, serves as support for the hollow shaft (to be described later) through the intervention of which the power control members for the carriage shift are reset.

Carriage shift drive

As has been mentioned above, the calculating machine is provided with a drive shaft 25 extending through the machine from left to right and intended for driving the carriage shift (Fig. 4). Rigidly connected to the drive shaft 25 is a ratchet 84a provided with five teeth 251a. Those parts of the clutch B for the carriage shift which correspond to similar elements of the clutch A are designated with the same reference numerals as the latter but with the additional character "a." The jaw 254a on the arm 109a of the two arm lever 109a, 253a cooperates with the teeth 251a. When turning the control shaft 98, associated with the drive shaft 25, in the direction indicated by the arrow, a coupling lever 108a may be released by a pawl 107 which lever 108a through the intervention of the clutch element 109a pivotally connected to the disc 89a at 95 and by means of the spring 110a establishes a clutch connection between the drive shaft 25 and the disc 89a. The tilting angle of the coupling lever 108a is limited by the pin 252a while the lever arm 253a of the lever 109a abuts the lever 108a. Rigidly connected to the disc 89a is a sleeve 111 which surrounds the shaft 25. Also rigidly connected to the disc 89a are a bevel gear 112 and an eccentric disc 113. The bevel gear 112 meshes with a bevel gear 114 of the same size which latter is rigidly connected to a shaft 115. The driving movement for the carriage is in a manner known per se conveyed from the shaft 115 through a pinion 116 to the gear 117 and from there to a gear 118 of the same size. The gears 117 and 118 are provided with clutch jaws 119 and 120 faced by corresponding jaws 121 and 122 respectively. Connected to the clutch jaws 121 and 122 are gears 123 and 124. The gear 123 is through the intervention of an intermediate gear 125 and the gear 124 and the intermediate gear 126 connected with the drive wheel proper or pin wheel 127 for the carriage. The gear or pin wheel 127 is furthermore provided with two pins 128 which are adapted to engage recesses 129a provided in a rake 129 connected with the carriage and which are adapted to move said rake by steps towards the left and toward the right. The pawl 131 which is under the influence of spring 130, and is journalled at 132 serves the purpose of determining the indexing steps of the carriage.

The rest position of the shaft 115 is determined by an indexing mechanism which comprises a disc 134 connected to the shaft 115 and provided with a recess 133 and also comprises an indexing lever 138 journalled at 137 and provided with a roller 135. Said lever 138 is under the influence of a spring 136.

The coupling of the drive wheel 127 to the drive shaft 25 is effected on one hand by turning the shaft 98 which carries the indexing pawl 107 and on the other hand by selectively making effective the two clutches 119, 121, and 120, 122 respectively. To this end, the movable coupling elements 121 and 122 are respectively provided with grooves 139 and 140 adapted to be engaged by the ends 141 and 142 respectively of two control trains or control rails 143 and 144. By means of springs 145 and 146 respectively connected to these control trains, the respective declutched position is maintained. The left or rightward carriage shift is made effective in such a way that either by means of the control train 143 the clutch 119, 121 is made effective, or by means of the control train 144 the clutch 120, 122 is made effective. After one of these two clutches has been made effective, the indexing pawl 107 is released so that connection with the drive is established through the intervention of the coupling wheel 84a and coupling disc 89a.

Control device for the carriage shift

With the calculating machine illustrated by way of example in the accompanying drawings, the control movement required for effecting the carriage shift is brought about by power actuated control members. This part of the device is primarily illustrated in Fig. 5. More specifically, the calculating machine is provided with levers 147 and 148 which are tiltably mounted on a shaft not shown in the drawings. These levers 147 and 148 are under the influence of strong tension springs 149 and 150 respectively and are pivotally connected with links 151 and 152 the ends of which straddle a bolt 155 by means of slots 153 and 154. The bolt 155 is connected to a lever 156 which in turn is connected to the control shaft 98 so as to rotate in unison therewith. The left end of the link 152 (with regard to Fig. 5) comprises a rectangularly bent-off portion 157 by means of which it is coupled with the hook shaped end 158 of the control train 144. A similar coupling is provided between the link 151 and the rectangularly bent-off portion 162 of the power control train 143. This coupling is effected through the intervention of the two arm lever 160, 161 which is tiltably mounted at 159, and the downwardly extending angled portion 163 of the lever arm 160. The release of the power actuated control members 147 and 148 is effected by command members 165, 166 tiltably mounted on the shaft 164. The command members 165, 166 due to the action of springs 167, 168 are adapted to engage corresponding recesses 169 and 170 of the power actuated control members 147 and 148. The device comprises a number of function control keys adapted to actuate the said two-arm levers. The two function control keys 7 and 8 respectively mounted on the key stems 171, 172 and provided with outwardly directed arrows are adapted to release the carriage shift movement. The coupling between the key stems 171 and 172 and the command members 165 and 166 respectively is effected by pins 173, 174 carried by the key stems. The two key stems 171 and 172 are locked relative to each other by means of a locking heart 176, which is tiltable about the shaft 175 in such a manner that only one or the other key can be depressed at a time. The spring 177 provided between the key stem 171 and command lever 165 represents a positive connection between these parts. This arrangement makes it possible to actuate the command member 165 also by control means other than the function control key 7 for the leftward shift of the carriage. The key stem 172 is furthermore provided with a pin 178 which is located below the bolt 174. Between the bolts 174 and 178 there is provided the free end of the command member 166 which in this way is form-locked with the key stem 172. The function control keys provided for releasing the calculating operation are designated by the reference numerals 9 and 10. The control trains operatively connected with the function control keys are for reason of clarity not shown in the drawing.

Figure 5:
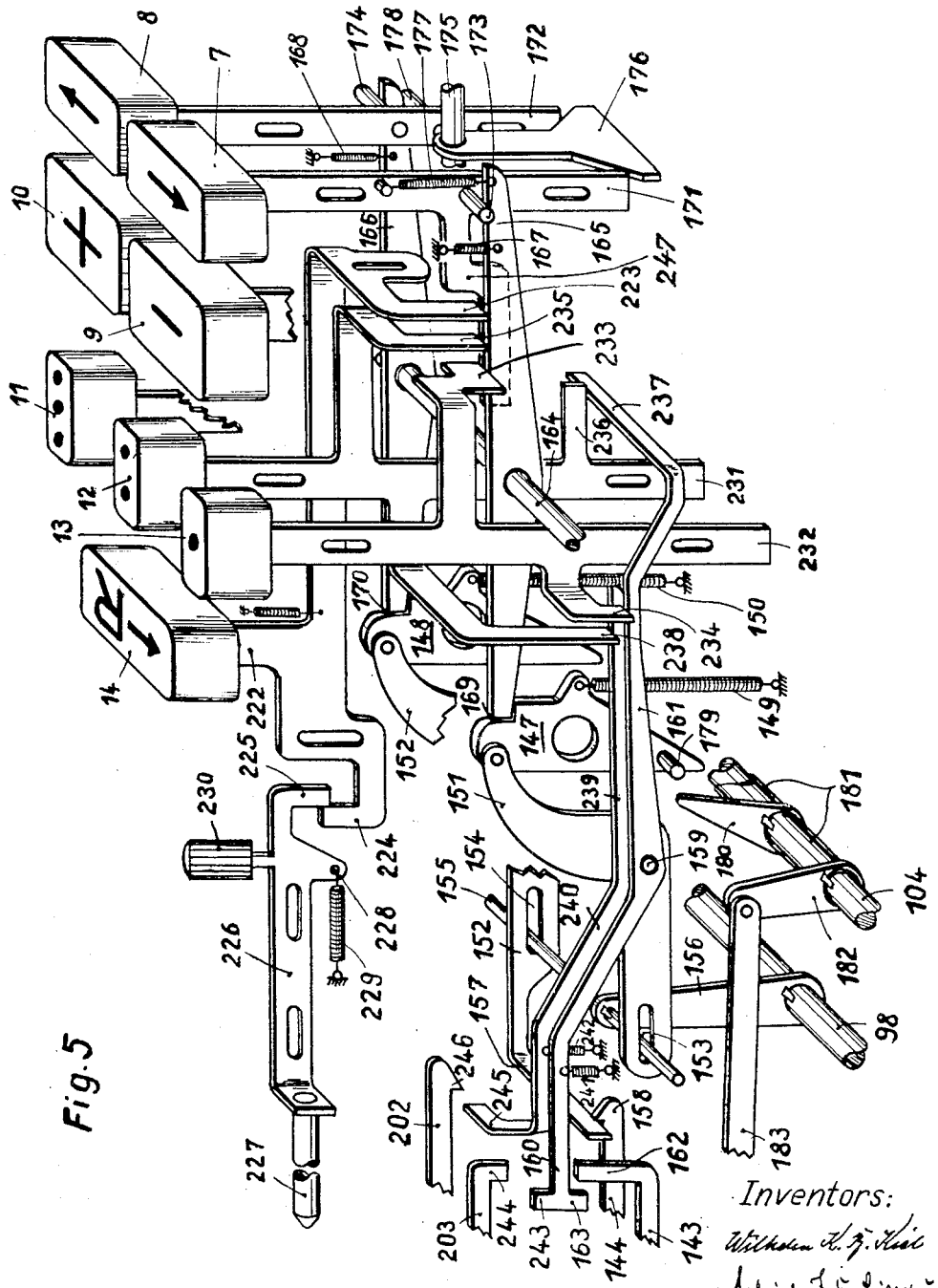
Fig. 5 represents a perspective and diagrammatic view of operating means pertaining to the part shown in Fig. 4 and intended for a four species calculating machine with automotive drive and a movable carriage.

It will easily be seen from Figs. 4 and 5 that by depressing one of the two function control keys 7 or 8, the carriage shift toward the left or the right can be made effective. By tilting, for instance, the command member 165 in clockwise direction, the power actuated control member 147 is likewise tilted in clockwise direction by the strong spring 149 as a result of which through the intervention of the link 151 and the lever 160, 161 and the angled portions 163, 162, the control train 143 is moved toward the right whereby the clutch 119, 121 is made effective. Simultaneously therewith, through the intervention of the bolt 155 and the lever 156, also the control shaft 98 has been turned so that the coupling between the shaft 25 and the disc 89a is established. Since in view of the turning of the shaft 98, also the driving motor has been switched on, the shaft 25 and thus also the shaft 115 perform a revolution until by the lever 107 and the pawl 108a, provided on the disc 89a, the coupling between the drive shaft 25 and the output shaft 115 is again made ineffective i. e. the driving connection between shaft 25 and the disc 89a is interrupted. The return of the power actuated control member 147 to its starting position is effected during this shifting movement by means of the resetting bolt 179, which is connected to the downwardly directed lever arm of the member 147 and by means of the cam 180 acting upon bolt 179. The cam 180 is mounted on a hollow shaft 181 surrounding the shaft 104. The corresponding resetting bolt and the respective cam of the control member 148 are not shown in the drawing in order not to clog up the drawing. The drive of the resetting shaft 181 is effected by means of a lever 182 which is rigidly connected with this shaft, an eccentric rod 183 being pivotally connected to the lever 182. The eccentric rod 183 has a head 184 which surrounds the eccentric disc 113 mounted on the sleeve 111 (Fig. 4). When depressing the function control key 8 for the rightward carriage shift, the coupling 120, 122 is made effective in a corresponding manner, and thus the gear system provided for the carriage shift is placed into position for carrying out the rightward movement of the carriage. In order to be sure that the clutch elements 119, 121 and 120 and 122 will each remain effective until a complete revolution of the drive shaft 115 has been carried out, the following safety measures have been devised. These safety measures comprise rectangular tongues 185, 186 provided on the control trains 143, 144 respectively. Locking pawls 189 and 190 which are under the influence of springs 187 and 188 respectively are adapted to catch behind the tongues 185 and 186, whereby the locking pawls 189 and 190 lock the control trains 143 and 144 in their respective effective positions. In order at the end of a revolution of the drive shaft 115 to release the locking pawls 189, 190 there is provided a two-arm lever 192, 193 which is under the influence of a spring 191. The lever arm 192 is adapted to be actuated by cam 194 mounted on the drive shaft 115, while the arm 193 is adapted to lift the locking pawls 189, 190. After the release of the locking pawl 189 or 190, the control trains 143 or 144 return to their starting position in view of the action of the springs 145, 146.

Clearing mechanism and carriage return

There will now be described the clearing mechanism, designed according to the present invention for the accumulator and counter mechanisms on the carriage, and the device for effecting the automatic carriage return.

The calculating machine illustrated in the drawings by way of example comprises only one revolutions counter mechanism and one accumulator mechanism in the carriage, while the clearing of these mechanisms is effected by clearing bars movable in the direction of the carriage movement, these clearing bars being only partly shown in Fig. 4 and being designated with the reference numerals 195 and 196. The clearing bars 195 and 196 are provided with a number of cut-outs or notches 197 and 198 into which the clearing levers 199 and 200 respectively may be moved. The two clearing levers are slidably mounted in axial direction on a square shaft 201 and are adapted to be moved into and out of the notches 197 and 198 provided in the clearing bars 195 and 196. This moving in and out of the two clearing levers may respectively be effected by the two control trains 202 and 203 through the intervention of the angled ends 206 and 207 adapted respectively to engage the grooves 204 and 205. The return of the clearing trains 202 and 203 is respectively effected by the springs 208 and 209. One end of the square shaft 201 has furthermore connected thereto a lever 210 which latter is pivotally connected to a link 211. This link 211 has its other end pivotally connected to a pivot 212 which is eccentrically mounted on the gear 116. The control trains 202 and 203 for causing the clearing levers 199 and 200 respectively to engage the notches in the clearing bars 195 and 196 are in a manner analogous to that of the control train 143 and 144 for releasing the carriage shift provided with tongues 213 and 214 behind which the locking pawls 217 and 218 may catch which pawls are under the influence of springs 215 and 216. The release of the locking pawls 217 and 218 is effected by the extension 219 of the lever arm 193. Of the control trains 143 and 144 and 202 and 203, always two control trains are arranged adjacent to each other over at least a certain distance. Inasmuch as these two groups must never be actuated simultaneously, there is provided an additional safety device illustrated in Fig. 4. This safety device comprises a two arm lever 220, 221. The lever arm 220 is provided with a portion for cooperation with the tongues 185, 186 while the tongues 213 and 214 are adapted to act upon the other lever arm 221. The lever 220, 221 thus prevents the control trains of different groups from becoming effective simultaneously.

As will be seen from Figs. 1 and 5, adjacent the keys 9 and 10 for plus and minus calculating, there are provided three further keys 11, 12, and 13 which successively serve for clearing the setting mechanism, for clearing the revolutions counter and for clearing the accumulator of the carriage. The control train for clearing the setting mechanism is for the sake of clarity not shown in the drawing.

Adjacent the clearing keys 11 to 13 there is, furthermore, provided a separate return key 14 which has an oblong shape. The return key together with the clearing keys form an operational group so that the various clearing keys and the return key may be actuated individually and also in a convenient manner by two's or more. The return key 14 is provided with a relatively short key stem 222 which by means of slots is vertically slidably mounted on the machine frame and which is adapted by means of an arm 223 to act upon the command member 165 for the leftward carriage shift. The angled portion 224 on the other side of the key stem 222 is adapted to lock the return key 14 in its depressed position. The angled portion 225 of a slide 226 guided on the machine frame by means of slots cooperates with the part 224, the other end of said slide being provided with a pressure pin 227. Connected to a tongue 228 of slide 226 is a tension spring 229 which tends to maintain the slide 226 in its leftward position (with regard to Fig. 5). Furthermore, the slide 226 is provided with a knob or handle 230. It will be clear from Fig. 5 that, when depressing the return key 14, the angled portion 224 of the key stem 222 will be spaced vertically from the slide 226 to such an extent that said slide due to the tension spring 229 is moved into its leftward position, in which the angled portion 225 is above the angled portion 224 and thus, maintains the return key 14 in its depressed position until either by manual operation of the knob or handle 230 or by means of the carriage and the intervention of the pressure pin 227, the slide 226 is moved rightwardly to such an extent that the return key 14 is by means of its return spring again returned to its starting position. The return movement of the return key and also of the other keys is preferably effected by means of pressure springs. In order not unnecessarily to clog up the drawings, only one of these pressure springs is shown, namely the spring for the return of the return key 14.

The clearing keys 12 and 13 are mounted on the upper end of key stems 231 and 232 respectively which are slidable in vertical direction. The key stem 232 is provided with two arms of which the arm 233 engages the command lever 165 while the other arm 234 engages the lever arm 161 of the switch over lever 160, 161. The key stem 231 comprises three arms, namely an arm 235 which likewise is adapted to engage the command lever 165, an arm 236 adapted to act upon the extension 237 of the lever arm 161 of the switch-over lever 160, 161, and a third arm 238 which is adapted to act upon the lever arm 239 of the two arm switch over lever 239, 240. This second switch-over lever 239, 240 is parallel to a considerable portion of the other switch-over lever 160, 161 and is likewise pivotally connected to the link 151 by means of the pivot 159. Respectively connected to the lever arms 160 and 240 of the two switch-over levers are tension springs 241 and 242 which springs are adapted to maintain the two levers in the starting position shown in the drawing. The left-hand end (with regard to Fig. 5) of the lever arm of the switch-over lever 160, 161 is furthermore provided with an upwardly angled portion 243 which is adapted to engage and catch behind the angled portion 244 of the control train 203. In a similar manner the lever arm 240 of the second switch-over lever 239, 240 is provided with an angled portion 245 which is adapted to engage the hook shaped end 246 of the control train 202.

*Operation of the clearing mechanism*

If, for instance, the clearing key 13 for the accumulator is depressed, the switch-over lever 160, 161 is tilted by the arm 234 of key stem 232 whereby the coupling with the carriage shift control train 143 is disconnected while the coupling with the clearing control train 203 is established. When further depressing the key stem 232, the command lever 165 is by means of the arm 233 tilted in clockwise direction to such an extent that the power actuated control member 147 is released, and, due to the strong tension spring 149, the link 151 is moved rightwardly, thereby also moving lever 160, 161 toward the right (with regard to Fig. 5). Consequently, the control train 203 is moved toward the right through the intervention of the switch over lever 160, 161 and the coupling elements 243, 244. Thus, due to the angled portion 207 of the clearing control train 203 and due to the hub 205a, the clearing lever 200 moves into such a position that it engages one of the recesses 198 of the clearing rail 196. Simultaneously, in a manner similar to that described in connection with the leftward shift of the carriage, the control shaft 98 is rotated through the intervention of the link 151, the bolt 155, and the lever 156 so that the motor as well as the repeatedly referred to coupling between the parts 84a and 89a become effective. The driving shaft 115, therefore, performs a revolution as a result of which through the intervention of the link 211 and the lever 210, the square shaft 201 and thus the clearing lever 200 carry out the clearing operation. After the control train 203 has been made effective, the locking pawl 218 has engaged the tongue 214 and has maintained the control train 203 in its effective position. This lock is made ineffective at the end of the revolution of the driving shaft 115, namely through the intervention of the control cam 194 and the two arm lever 192, 193 and the extension 219 thereof respectively. The safety lever 220, 221 at this time prevents either one of the two shift trains 143 and 144 from being moved into its effective position. A further assurance that, for instance, the leftward shift of the carriage is not made effective at this time is obtained by the fact that, as will be seen from Fig. 5, parallel to and alongside and behind the command lever 165 the key stem 171 is provided with an arm 247. When the command lever 165 is intended to be tilted by means of the arm 235 or 233 when depressing the clearing key 12 or 13 or when actuating the return key 14, the arm 247 carries along the key stem 171 and its key 7. However, inasmuch as the release of the rightward shift of the carriage has been effected by depressing the key 8, the locking heart 176 has been tilted by the key stem 172, and the key stem 171 has been locked. Consequently, none of the keys 12 to 14 can be actuated. On the other hand, the key stem 172 and thus the key 8 for the rightward carriage shift, cannot be moved into effective position when the command lever 165 by actuation of one of the keys 7, 12, 13 or 14 has been tilted and thus due to the correspondingly tilted locking heart 176 the key stem 172 of the key 8 has been blocked. The spring 177 takes care that the bolt 173 engages the command lever 165.

It will also be seen from Figs. 4 and 5 that, when depressing the key 12 for the clearing of the revolutions counter, quite an analogous effect is being produced. In this instance, through the intervention of the arm 236 of the key stem 231 and due to the intervention of the extended lever portion 237, the switch-over lever 160, 161 is moved into such a position that the hammer shaped part 163, 243 of the left lever arm 160 occupies such an intermediate position that the part 163, 243 can freely move between the two angled portions 162 and 244 of the two control trains 143 and 203 respectively. Furthermore, through the intervention of the arm 238 of key stem 231, the second switch-over lever 239, 240 is moved into such a position that the parts 245, 246 are coupled with each other. After the coupling has thus been established, due to the arm 235, the command lever 165 is made effective. As a result thereof, in an analogous manner, due to the link 151, the lever 239, 240 and the coupling parts 245, 246, the control train 202 is adjusted and due to the angled end 206, the clearing lever 199 is moved into one of the notches 197. The remaining operations are being carried out in a manner analogous to those described in connection with the other clearing control trains. Also in this instance the locking pawl 217 completely locks the control train 202 until the clearing movement has been completed. The return of the locking pawl 217 and thus of the control train 202 is likewise effected by the extention 219 of the angle lever 192, 193. Also in this instance, the two arm lever 220, 221 serves as additional safety means in order to prevent that, while one of the two clearing control trains 202, 203 is in its effective position; the control trains 143, 144 for the rightward and leftward carriage shift can be made effective simultaneously. A further safety arrangement is, as mentioned above, formed by the arm 247 of the key stem 171 pertaining to the key 7 for leftward carriage shift. As has been mentioned, when depressing the clearing key 12, the arm 235 by means of the arm 247 carries along the key stem 171 of key 7 and thus blocks the key stem 172 of key 8 by means of the locking heart 176. Thus, the blocked key 8 makes it impossible to make effective the command for the rightward carriage shift.

As will furthermore be seen from the drawing, the arrangement shown therein makes possible simultaneously to depress the two clearing keys 12 and 13, thereby simultaneously making effective the two clearing levers 199 and 200. In this instance, merely the switch-over lever 160, 161 is tilted by the arm 234 on key stem 232 in clockwise direction to such an extent that the two coupling parts 243, 244 engage each other. Similarly, through the intervention of the arm 238 on key stem 231, the coupling part 245 of the switch over lever 239, 240 is brought into operative engagement with the coupling part 246 on the clearing control train 202 so that, when the command lever 165 is released, through the control member 147, link 151 and the two switch-over levers 160, 161 and 239, 240, the two clearing operations are effected simultaneously. Also in this instance key 8 is blocked, namely through the intervention of the arm 247 of key 7 upon which the arms 235, 233 of the clearing keys 12 and 13 act.

As will be seen from Fig. 5, it is possible simultaneously with the two clearing keys 12 and 13 also to depress the return key 14 without blocking the machine. In this instance, first by means of the key stems 231 and 232 respectively and the corresponding arms, the switch over levers 160, 161 and 239, 240 are tilted in clockwise direction, whereby the clearing command or clearing commands is or are carried out. After termination of the working operations described for the clearing process, the two switchover levers 160, 161 and 239, 240 respectively move counterclockwise and return to their starting positions so that the coupling part 163 is arranged for cooperation with the coupling part 162 of train 143. In the meantime, the return command has been stored due to the fact that the slide 226 has moved to its leftward position, as a result of which the command lever 165 occupies a position in which the power operated control member 147 is still released. Subsequently to the first operation carried out in connection with the clearing command, the return shift of the carriage is effected inasmuch as the control train 143 through the coupling parts 162 and 163 is moved into its effective position, whereby the coupling elements 119, 121 are moved into their engaged or effective position, while the control shaft 98 maintains a position in which the coupling elements 84a, 254a are in their effective coupled positions. The carriage, therefore, moves toward the left until either by hand through the knob or handle 230 or through the intervention of the pressure pin 227, the locking engagement between the elements 224, 225 is made ineffective and the return key 14 returns to its starting position.

If the command "clearing" is effected after the return movement has been started by depressing the return key 14, the machine interrupts the return movement due to the coupling between the coupling parts 162, 163 having been made ineffective, and first carries out the clearing command or clearing commands. Subsequently, the return command is completed until the slide 226 has been actuated by the carriage through pin 227 so that it occupies Fig. 5 position and part 224 has been released to allow key 14 to return to its Fig. 5 position.

More specifically, if for instance the command "clearing" is keyed in for both the accumulator and the revolutions counter, the two switch-over levers 160, 161 and 240, 239 are tilted as far as the position of the angled or hook-shaped portions 244, and 246 will permit. The coupling part 243 of the lever 160, 161 will move underneath the angled or hook-shaped portion 244 but never in front of the latter so that a blocking cannot occur. Similarly, the coupling part 245 will move against the inclined edge of the hook-shaped portion 246 of the train 202 so that during the return of the link 151 to its normal position, the angled part 245 can slide back unimpededly until the angled part 245 interlocks with the hook-shaped portion 246. Similarly, when the link 151 returns to its normal position, the upper edge of the part 243 slides along the lower edge of the angle-shaped portion 244 until the latter interlocks with the portion 243. Thus, the function control keys for the clearing of the counting mechanisms, i. e. accumulator and revolutions counter, in the carriage may be actuated at any time, which means also after the return key 14 has been depressed and the machine just occupies a mid-cycle position.

The locking of the clearing control trains with regard to the control trains for leftward and rightward carriage shift is thus brought about on one hand by the switch-over lever 160, 161, and on the other hand by the safety lever 220, 221. If one of the two control trains 143 or 144 is made effective and is locked by the two locking pawls 189, 190, it is not possible to move one or both control trains 202, 203 for the clearing into effective position and vice versa.

It is, of course, to be understood that the present invention is by no means limited to the particular construction and arrangement shown in the drawings but also comprises any modifications within the scope of the appended claims.

What I claim is:

1. A calculating machine having an ordinally shiftable carriage movable by motor means relative to a stationary machine frame, and having a revolutions counter and an accumulator mechanism supported by said carriage, which comprises in combination, a first carriage shift control train operable to cause said motor means to shift said carriage in one direction, a second carriage shift control train operable to cause said motor means to shift said carriage in the opposite direction, a first clearing train for clearing said accumulator mechanism, a second clearing train for clearing said revolutions counter, a first power control train operable to actuate said first carriage shift train, a first power operable control member adapted when released to actuate said first power control train, a first command member operable selectively to release said first power operable control member, a second power control train operable to actuate said second carriage shift train, a second power operable control member adapted when released to actuate said second power control train, a second command member operable selectively to release said second power operable control member, first and second coupling lever means pivotally connected to said first power control train and adapted to be connected to said first and second clearing train respectively to thereby operatively connect the same with said first power control train, said first coupling lever means being normally operatively connected to said first carriage shift control train, first manually operable key means for bringing about operation of said first clearing train, and second manually operable key means for bringing about operation of said second clearing train, said first and second key means being arranged to actuate said first command member and to shift the respective lever means into position for coupling said first power control train to the respective clearing train.

2. A calculating machine according to claim 1, in which said first coupling lever means is normally coupled with said first carriage shift train and is adapted in response to a predetermined movement of said second key means to be moved into a neutral position in which it has no coupling effect and adapted in response to a predetermined movement of said first key means to be moved into a position in which it couples said first power control train to said first clearing control train.

3. In a calculating machine having an ordinally shiftable carriage and a first and a second carriage shift train respectively movable from an ineffective position into an effective position for respectively moving said carriage in either direction, an accumulator and a revolutions counter supported in said carriage, and a first and second clearing train respectively movable from an ineffective to an effective position for respectively clearing said accumulator and revolutions counter, the combination of: two power control trains operable to move said shift and clearing trains to effective position, one of said power control trains being adapted to be operatively connected with one of said carriage shift trains and the two clearing trains, a pair of power actuable control members respectively movable from an ineffective to an effective position for actuating said power control trains, a pair of command members selectively operable to respectively allow said power actuable control members to move into their effective positions, a plurality of key means, each of said key means being operable to actuate one of said command members, and locking means adapted in response to the actuation of one of said key means acting upon one of said command members to prevent actuation of the other command member.

4. A calculating machine according to claim 3, which includes a pair of locking pawls arranged for respective cooperation with said clearing trains to lock the same in their effective positions, and a pair of locking pawls arranged for respective cooperation with said shift trains to lock the same in their effective positions.

5. In a calculating machine having an ordinally shiftable carriage and a first and second carriage shift train for respectively moving said carriage in either direction, an accumulator and a revolutions counter supported in said carriage and a first and second clearing train for clearing said accumulator and counter, the combination of: two power control trains operable to move said shift and clearing trains to effective position, one of said power control trains being adapted to be operatively connected with one of said carriage shift trains and the two clearing trains, a pair of power actuable control members respectively movable from an ineffective to an effective position for actuating said power control trains, a pair of command members selectively operable to respectively allow said power actuable control members to move into their effective positions, first carriage shift key means operable to actuate one of said command members to bring about movement of said carriage in one direction, second carriage shift key means operable to actuate the other command member to bring about movement of said carriage in the other direction, first and second clearing key means operable to act upon one and the same of said command members to respectively bring about a clearing of the accumulator and counter, a carriage return key means also operable to act upon said last mentioned command member for bringing about a return movement of said carriage, and locking means interposed between said two carriage shift key means and operable in response to the actuation of either one of said carriage shift key means to block actuation of the other carriage shift key means, that carriage shift key means which is adapted to act upon the same command member as said clearing and return key means being provided with an arm adapted in response to the actuation of the other carriage shift key means to act as blocking abutment for said clearing and return key means to prevent actuation thereof.

6. A calculating machine according to claim 5, in which that carriage shift key means which is adapted to act upon the same command member as said clearing and return key means is provided with abutment means adapted to engage said last mentioned command member for actuating the same, and yielding means for holding said command member in engagement with said abutment means.

7. In combination in a calculating machine: an ordinally shiftable carriage, a first and second carriage shift train respectively movable from an ineffective position into an effective position for respectively moving said carriage in either direction, said shift trains including pin wheel means for moving said carriage by ordinal steps, a drive shaft operable to actuate said pin wheel means, an accumulator and a revolutions counter supported in said carriage, a first and second clearing train movable from an ineffective position into an effective position for respectively clearing said accumulator and revolutions counter, each of said clearing trains including a clearing rail and an oscillatable lever adapted operatively to engage and reciprocate said rail, a control shaft common to said levers and operatively connected thereto for oscillating said levers, link means operatively interconnecting said control shaft with said drive shaft to thereby allow actuation of said control shaft by said drive shaft, a first pair of locking members adapted respectively to maintain said clearing trains in their effective positions, a second pair of locking members adapted respectively to maintain said shift trains in their effective positions, release cam means connected to said drive shaft so as to rotate therewith, and release lever means adapted in response to the completion of a complete revolution of said drive shaft to be actuated by said release cam means so as to release said first and second pair of locking members to allow said clearing and shift trains to return to their respective ineffective positions.

8. A calculating machine according to claim 7, which includes locking means operable by either one of said shift trains and said clearing trains and adapted in response to the movement of either clearing train into its effective position to prevent movement of either one of said shift trains into effective position and also adapted in response to the movement of either shift train into its effective position to prevent movement of either one of said clearing trains into effective position.

9. A calculating machine according to claim 7, in which said shift trains are grouped together to a first group while said clearing trains are grouped together to a second group, a two arm shiftable lever being provided which has one of its lever arms arranged for selective engagement by either train of said first group and has its other lever arm arranged for selective engagement by either train of said second group, said lever being adapted in response to the engagement of either one of its lever arms by either one of the adjacent trains in effective position of the latter to cause the other lever arm of said two arm lever to engage the trains of the other group to hold the same locked in ineffective position.

10. A calculating machine having a carriage ordinally shiftable by motor means relative to a stationary machine frame, which comprises in combination: a revolutions counting mechanism carried by said carriage, an accumulator mechanism carried by said carriage, clearing keys movably mounted in said stationary machine frame, clearing train means adapted to be operatively connected with said revolutions counting and accumulator mechanisms and said motor means in response to the actuation of said keys to clear said revolutions counting and accumulator mechanisms in any ordinal position of said carriage, carriage shifting means adapted to be connected with said motor means, a carriage return key mounted in said stationary frame, control means adapted to operatively connect said motor means with said carriage shifting means in response to the actuation of said return key for establishing a driving connection between said carriage shifting means and said motor means to cause said motor means to shift said carriage toward predetermined ordinal and position, and means operatively connected to said clearing keys and adapted in response to the actuation of at least one of said clearing keys subsequent to the actuation of said return key to temporarily interrupt the driving connection between said carriage shifting means and said motor means to thereby allow the respective clearing operation without interference by the carriage return and thereafter to reestablish said driving connection upon release of said clearing key.

11. A calculating machine according to claim 10, in which said control means comprises a lever arm and spring means connected to said lever arm and arranged to move said lever arm from an ineffective to an effective position to effect said driving connection between said carriage shifting means and said motor means, cyclically operable means adapted to return said lever arm from said effective position to said ineffective position, locking means operable in response to the actuation of said return key to hold said return key in its set position until the carriage return has been completed, and means operatively connected to said return key and clearing keys and adapted in response to the actuation of both of said return key and clearing keys to allow said lever arm to return to its effective position so as subsequent to the release of said clearing keys to interrupt the driving connection between said clearing train means and said motor means and automatically again to establish driving connection between said carriage shifting means and said motor means whereby said carriage is shifted to its predetermined position.

12. In a calculating machine having an ordinally shiftable carriage, an accumulator and revolutions counter supported in said carriage, first and second carriage shift trains for respectively shifting the carriage in opposite directions and first and second clearing trains for clearing the accumulator and counter respectively, the combination of: a first power control train operable to actuate said first carriage shift train, a first control member, first yielding means continuously urging said first control member into effective position for actuating said first power control train, a first command member normally locking said first control member in an ineffective position, said first command member being operable to release said first control member to thereby allow said yielding means to move said first control member into effective position, a second power control train operable to actuate said second carriage shift train, a second control member, second yielding means continuously urging said second control member into effective position for actuating said second power control train, a second command member normally locking said second control member in its ineffective position, said second command member being operable to release said second control member to thereby allow said second yielding means to move said second control member into effective position, first and second coupling lever means pivotally connected to said first power control train and adapted selectively to be moved into position for respectively connecting said first power control train with said clearing trains, said first coupling lever means being normally coupled to said first carriage shift train, first and second clearing key means respectively operable to actuate said first command member so as to release said first control member and to respectively move the first or second coupling lever means into connecting position depending on whether said first or second clearing key means has been operated, said second clearing key means also being adapted to contact and move said first coupling lever means into neutral position in which it has no coupling effect, said first coupling lever means having its pivot spaced from its point of contact with said second clearing key means by a distance greater than the distance between its pivot and said first clearing key means.

13. A calculating machine having a carriage ordinally shiftable by motor means relative to a stationary machine frame, which comprises in combination: a plurality of register mechanisms, at least one of said register mechanisms being supported by said carriage, a plurality of clearing keys movably mounted in said stationary machine frame, clearing train means adapted to be operatively connected with said register mechanisms and said motor means in response to the actuation of said keys to clear said register mechanisms, carriage shifting means adapted to be connected with said motor means, a carriage return key also mounted in said stationary frame, control means adapted to operatively connect said motor means with said carriage shifting means in response to the actuation of said return key for establishing a driving connection between said carriage shifting means and said motor means to cause said motor means to shift said carriage toward a predetermined ordinal end position, and means operatively connected to said clearing keys and adapted in response to the actuation of said clearing keys subsequent to the actuation of said return key to interrupt said driving connection between said carriage shifting means and said motor means regardless of the respective position of said carriage to thereby allow the clearing of said registering mechanisms without interference by said carriage shifting means and thereafter to reestablish said driving connection upon release of said clearing keys.

14. A calculating machine including two registering mechanisms and two clearing rails for respectively clearing said registering mechanisms, which comprises in combination: two clearing levers arranged for respective engagement with and actuation of said clearing rails; normally ineffective driving means for said clearing levers two clearing control trains adapted respectively to engage said clearing levers and render said driving means effective; power actuable control means common to said control trains and adapted to actuate the latter; a plurality of coupling means pivotally connected to said power actuable control means and operable to establish operative connection between said control trains and said power actuable control means; two clearing keys respectively connected to said coupling means for adjusting the latter and command means respectively operatively connected to said clearing keys and operable by the latter; said power actuable control means normally being held in an ineffective position by said command means and being arranged in response to the actuation of said command means and adjustment of one of said coupling means by a respective one of said clearing keys automatically to actuate said control trains to effect operative engagement of said respective clearing lever with said clearing rail pertaining thereto and corresponding to the actuated clearing key and to render the driving means effective.

15. A calculating machine according to claim 14, in which each of the clearing keys for the registering mechanisms has a multi-arm key stem, one arm of each key stem respectively being arranged for engagement with one coupling means and another arm of each key stem being arranged for engagement with said command means, the arrangement being such that each key stem when actuated successively tilts a coupling means and subsequently actuates said common power actuable control means.

16. A calculating machine having an ordinally shiftable carriage shiftable by motor means relative to a stationary machine frame, and registering mechanisms supported by said carriage, which comprises in combination: carriage shift control trains to cause said motor means to shift said carriage in opposite directions, clearing trains for clearing said registering mechanisms, clearing control trains to operatively connect said motor means with said clearing trains, power control trains operable to actuate said carriage shift control trains, command members operable selectively to release said power control trains, a plurality of coupling lever means pivotally connected to one of said power control trains and adapted to be connected to said clearing control trains respectively to thereby operatively connect said clearing control trains with said one of the power control trains, one of said coupling lever means being adapted to be operatively connected with one of said carriage shift control trains, and a plurality of manually operable key means for bringing about operation of said clearing trains, said key means being arranged to actuate said one of said command members and to shift the respective coupling lever means into position for coupling said one of the power control trains to said clearing control trains, respectively.

References Cited in the file of this patent
UNITED STATES PATENTS

| | | |
|---|---|---|
| 2,252,621 | Eichler | Aug. 12, 1941 |
| 2,416,809 | Avery | Mar. 4, 1947 |

FOREIGN PATENTS

| | | |
|---|---|---|
| 195,376 | Switzerland | June 16, 1938 |